United States Patent [19]
Thiriat et al.

[11] Patent Number: 5,960,702
[45] Date of Patent: Oct. 5, 1999

[54] BREAD TOASTER APPARATUS WITH VISUAL MONITORING

[75] Inventors: Sylvain Thiriat, Cleurie; Michel Klinger, Stosswihr, both of France

[73] Assignee: SEB S.A., Ecully, France

[21] Appl. No.: 09/101,471

[22] PCT Filed: Jan. 9, 1997

[86] PCT No.: PCT/FR97/00040

§ 371 Date: Sep. 14, 1998

§ 102(e) Date: Sep. 14, 1998

[87] PCT Pub. No.: WO97/24967

PCT Pub. Date: Jul. 17, 1997

[30] Foreign Application Priority Data

Jan. 10, 1996 [FR] France ................................. 96 00395

[51] Int. Cl.[6] .............................. A47J 37/08; H05B 1/02
[52] U.S. Cl. ............................... 99/327; 99/331; 99/341; 99/385; 99/389; 219/492; 219/521
[58] Field of Search ........................... 99/326–333, 339, 99/341, 342, 389–391, 385, 393, 400, 401; 219/501, 502, 506, 512, 514, 518–521, 492, 494, 497, 464, 398, 405, 408, 413; 426/241, 243, 523

[56] References Cited

U.S. PATENT DOCUMENTS

| | | | |
|---|---|---|---|
| 1,893,989 | 1/1933 | Galer | 99/390 X |
| 1,926,276 | 9/1933 | Forbes | 99/332 |
| 1,967,209 | 7/1934 | Lawrence | 99/327 |
| 1,979,845 | 11/1934 | Schallis | 99/332 |
| 2,631,523 | 3/1953 | Olving | 99/331 X |
| 2,764,081 | 9/1956 | Glasser | 99/390 X |
| 4,345,513 | 8/1982 | Holt | 99/401 X |
| 5,528,980 | 6/1996 | McClean | 99/389 |
| 5,642,657 | 7/1997 | Yeung et al. | 99/393 X |
| 5,802,957 | 9/1998 | Wanat et al. | 219/521 X |

FOREIGN PATENT DOCUMENTS

| | | |
|---|---|---|
| 0 033 642 | 8/1981 | European Pat. Off. . |
| 2 050 772 | 4/1991 | France . |
| 2 707 858 | 1/1995 | France . |
| 90 15 300 U | 3/1991 | Germany . |
| 42 14 297 | 11/1993 | Germany . |

*Primary Examiner*—Timothy F. Simone
*Attorney, Agent, or Firm*—Pillsbury Madison & Sutro

[57] ABSTRACT

A toasting apparatus for bread products (15), consisting of a frame (2) provided with an insertion slot (3) communicating with a toasting chamber (3*a*) that receives the products and is located between heating elements (10) combined with heat reflectors (6) for directing the thermal energy generated by the heating elements (10) at the products, particularly in the form of radiation. The apparatus is provided with an observation system for visually monitoring the degree of toasting of the products (15) in the toasting chamber (3*a*). The observation system includes a lighting device (11) for illuminating the toasting chamber (3*a*) in such a way that an accurate indication of the color of the products (15) being prepared is provided. The toasting apparatus may be in the form of a toaster.

16 Claims, 2 Drawing Sheets

BREAD TOASTER APPARATUS WITH VISUAL MONITORING

BACKGROUND OF THE INVENTION

The present invention related to the general technical field of devices and appliances having as their object toasting and/or reheating of edible food products by the intermediary of an infrared radiation treatment. The invention concerns a toasting and/or reheating appliance for food products of the bread type. The invention concerns particularly a bread toaster.

The present invention thus relates in particular to a toasting appliance for bread products, constituted by a frame provided with an insertion slot opening on a toasting chamber intended to receive the products, and disposed between heating elements associated with heat reflectors, which permit heat energy, produced by the heating elements, notably in the form of radiation, to be directed toward the products, said appliance being provided with observation means for visual monitoring of the degree of toasting of said products placed in the toasting chamber.

It is thus already known, from the document FR-A-2,050,772, to provide a toaster furnished with a window for observation of the toasting operations. In effect, it is a matter of an electric toaster having the form of a housing whose lateral walls form the toasting chamber. Transparent windows are arranged in said walls in a manner to permit the user to observe the bread slices disposed in the toaster. The heating elements as well as the heat reflectors of the toaster are disposed in such a manner that they do not mask the bread slices that it is necessary to observe. There are thus interior surfaces of the housing which can serve as reflectors. Special reflectors can equally be mounted at the interior of the housing.

One problem, connected with the design of the toaster described in this document, resides in the positioning on the housing of observation windows having a substantial surface in a manner to obtain a sufficient visibility generating, at the same time, a substantial loss of thermal radiation. The positioning of the specific reflectors does not allow for a solution for this problem starting from the moment where these latters are disposed in a manner to not diminish visibility.

Another shortcoming of the toaster described herein is equally connected with visibility constraints. In effect, the form or the specific arrangement of the heat reflectors significantly alters the quality of the toasting of the bread slices and provokes a significant heating of the housing. In effect, significant infrared radiation leakages have as a consequence to increase the toasting time of the bread slices in order to obtain an acceptable degree of cooking. Such an increase in the duration of toasting very often provokes an excessive drying of the bread slices. Such a drying is equally linked to the nature and/or the freshness of said bread slices which causes the attainment of an optimal grilling quality with the toaster described herein to be very uncertain.

Another drawback linked with the utilization of a toaster described in the above-mentioned document results from the influence of ambient light or possibly the visible spectrum radiated by the heating elements. The observed image of the color of the products being prepared is often altered with respect to the real color. The wavelength of the maximum energy emitted by the heating resistances generates a dominant red which is very remote from the spectrum of the usual lighting lamps. This is often found to be annoying.

BRIEF SUMMARY OF THE INVENTION

The object of the present invention thus aims to provide a toasting apparatus, in particular, a toaster, which does not present drawbacks found in the prior art, and which furnishes to the user, in a simple and inexpensive manner, a reliable and realistic monitoring of the degree of cooking or the color of the products prepared in such appliance.

Another object of the invention is to provide means for visual access as to the interior of the cooking chamber while not substantially affecting the time and temperature or power performance of the toasting appliance. A complementary object of the present invention is to provide a toasting appliance whose accessible external walls do not experience an excessive heating linked with heat leakages by radiation.

The objects assigned to the present invention are achieved with the aid of observation means comprising a means for lighting the toasting chamber in a manner to restore an accurate image of the color of the products prepared.

BRIEF DESCRIPTION OF THE SEVERAL VIEWS OF THE DRAWING

Other characteristics and advantages of the invention will appear in the description given here below with reference to the attached drawings in which.

DETAILED DESCRIPTION OF THE INVENTION

Figure 1:
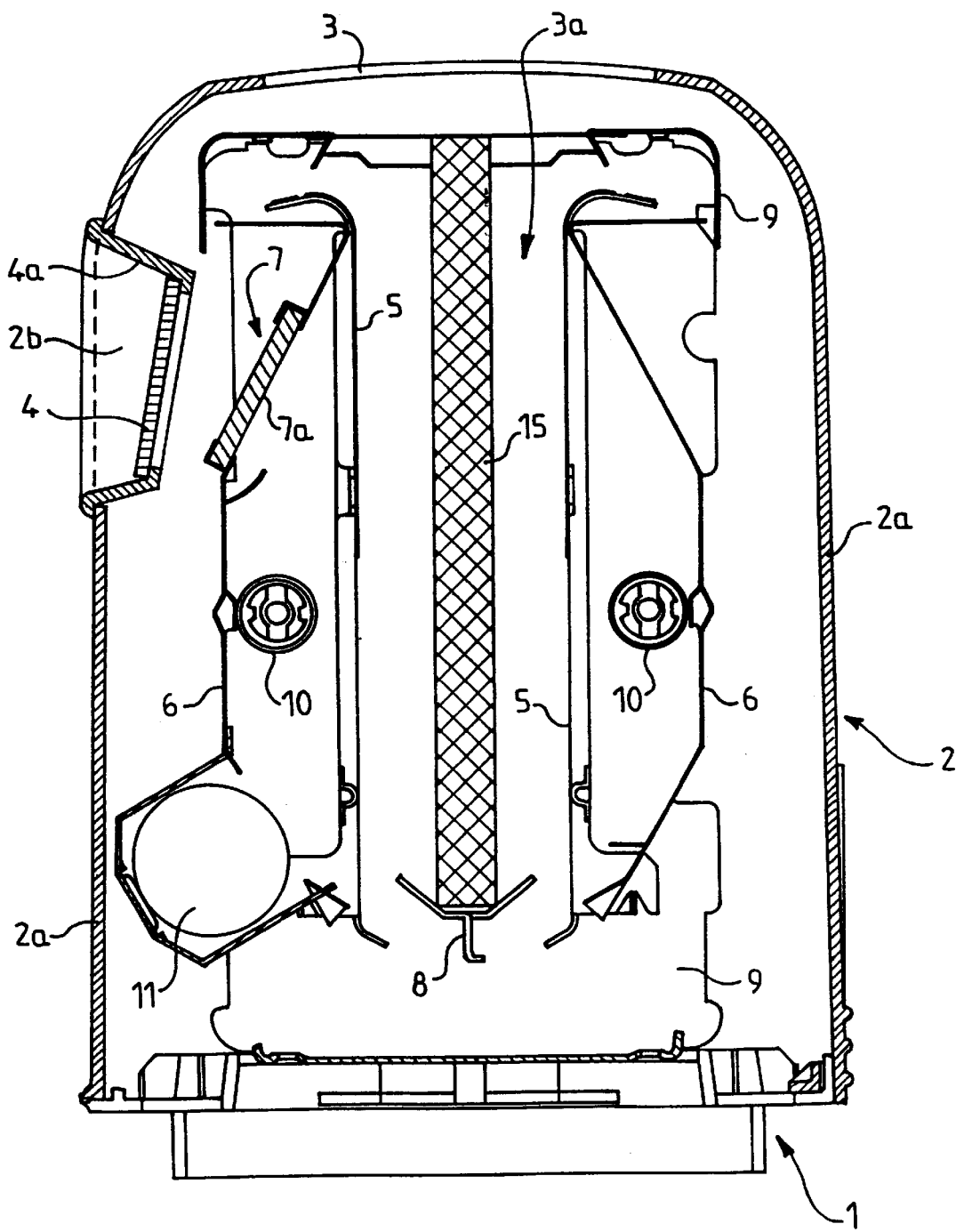
FIG. 1 a cross-sectional view of a toasting appliance according to the invention.

The toasting appliance according to the invention shown in FIG. 1, provides, for example, a toaster. This appliance comprises a base 1 on which it is mounted a frame 2. This latter presents, for example, a parallelepiped form. The materials constituting base 1 and frame 2 are, for example, stainless metal materials or even plastic materials resistant to high temperatures. The frame 2 also has an insertion slot 3 directed towards the top and extending for example in a horizontal plane. The localization of the insertion slot 3 in the upper part of the frame 2 permits defining a toasting chamber 3a with vertical insertion for bread products. The toasting chamber 3a is, preferably, localized in the central part of the appliance. The frame 2 is fixed on the base 1 by any means and surrounds a metal structure 9 supporting an assembly of elements delimiting and defining the toasting chamber 3a. The metal structure 9 thus supports heat reflectors 6 arranged to one side and the other of the toasting chamber 3a and preferably its long sides, when this latter presents a parallelepiped form. The frame 2 and the heat reflector 6 can also be constituted by a single metal piece. Alternatively, the frame 2 can be made of several pieces, one of which is transparent and of polymer or glass or has a transparent zone obtained for example by simultaneous injection of opaque and transparent materials.

Heating elements 10 are associated with heat reflectors 6 in a manner to produce infrared and visible radiation possibly directed on products 15 disposed in the toasting chamber 3a. The dimensions and configuration of heat reflectors 6 are optimized in order to on the one hand direct the heat energy produced toward the products 15 on at least one of their sides having a substantial surface. This is particularly advantageous for bread slices.

The heat reflectors 6 equally provide heat screens disposed between the heating elements 10 and the walls 2a, which are made, for example, of a plastic material. The toasting chamber 3a is also delimited by the intermediary of a fixed grid 5 mounted on the heat reflectors 6 in a manner to provide a separation between the accessible internal volume of the toasting chamber 3a and the heating elements 10 associated with their heat reflectors 6. This permits a direct contact between the heating elements 10 and the products 15 introduced into the toasting chamber 3a to be avoided, while not interfering with the circulation of heat energy in the form of radiation or convection. In effect, a particular form of the heat reflectors 6, preferably a form which is curve or angled toward the upper part of the appliance, permits at least partial direction of the heat energy in the form of convection toward the products 15.

The appliance according to the invention also comprises a support 8 which is movable within the toasting chamber 3a and intended to displace the products 15. This support 8 permits bread products 15 to be disposed in a toasting position in a first time and to evacuate said prepared products 15 from the toasting chamber 3a in a second time. The support 8 is made in a known manner and is present in the form of a movable carriage, which is either accessible manually from outside the appliance or is automatically controlled by an electric motor. Means for maintaining the support 8 in its lower position corresponding to the placement of the products 15 in the toasting chamber 3a can also be provided. The fixed grid 5 is advantageously made with rods or wires of stainless steel.

According to a modified embodiment of the appliance according to the invention, the fixed grid 5 is movable or nonmoveable on at least one side of the toasting chamber 3a in a manner to modulate the dimensions of this latter and to center the bread between the heating resistances. Advantageously, heat reflectors 6 are displaced with the moveable grid. The appliance defines, for example, a toaster having a variable capacity.

The toasting appliance according to the invention is also provided with observation means for visual monitoring of the degree of toasting of the products 15 placed in the toasting chamber 3a. The observation means comprise for this purpose a means 11 for lighting the toasting chamber 3a in a manner to restore a faithful image of the color of the prepared products 15. In effect, it is the color of the products 15 subjected to infrared radiation emitted by the heating elements 10 and the heat reflectors 6 which permits a determination of the progress of the toasting operations. Such an evolution should, in the framework of the present invention, be observable by the user of the toasting appliance. Observation should in addition not be curtailed or altered by ambient visible light or visible radiation by the heating elements 10 knowing that these latters are made, for example, with bars of ceramic material of the steatite type or a silica-based material, on which or in which resistive heating filaments are coiled. The heating elements 10 can also comprise for example a mica plate supporting resistive filament. The mica plate comprises for example an observation opening in a manner to achieve visual access to the toasting chamber.

The visible radiation emitted by these heating elements 10 do not permit in general a restoration of the true color of the toasted products 15. The provision of the lighting means 11 permits, as a result, these problems to be remedied. The lighting means 11 is advantageously mounted on the heat reflector and permits by the intermediary of an opening arranged in said heat reflector 6, the products 15 placed in the toasting chamber 3a to be illuminated. Advantageously, the lighting means 11 is localized at the interior of the appliance in a manner to at least partially illuminate the bread products 15 on at least one side. The lighting means 11 can be mounted, by way of example, in a low position at the interior of the appliance. The lighting means 11 is for example connected in series with the heating elements. The lighting means 11 is equally connected on a midpoint of a dividing bridge constituted by heating elements 10 connected in series. The reduced voltage supply of the lighting means permits the use of lamps or bulbs which are more robust and reliable.

According to a modified embodiment of the appliance according the invention, the lighting means is localized in the appliance in a manner to illuminate the products 15 on at least two sides. Various other placements of the lighting means 11 can equally be envisioned without departing from the framework of the present invention. Thus, illumination of the bread can be obtained by lighting which is direct or reflected by a mirror or conducted by an optical fiber. This last concept permits a lamp to be placed in a cooler zone, shielded from crumbs.

The lighting means 11 furnishes a radiation in the spectrum of wavelengths which extend from 0.5 $\mu$m to 1.5 $\mu$m and preferably from 0.9 $\mu$m to 1.1 $\mu$m. Such a spectrum of wavelengths permits the user to monitor in a precise manner the state of progress of the toasting or cooking operations at the interior of the toasting chamber 3a. The user can thus observe the products 15 during toasting operations through the slot 3 or a transparent part of the frame 2. By way of example, the lighting means 11 comprises at least one halogen lamp. Incandescent, fluorescent or discharge lamps can equally be suitable for use as the lighting means 11. According to a modified embodiment of the toasting appliance according to the invention, the lighting means 11 is constructed with the heating elements 10. These latters furnish under these conditions a radiation whose wavelength for the maximum emitted energy is less than 1.5 $\mu$m and preferably less than 1.2 $\mu$m. Such heating elements 10 preferably provide a useful spectrum of wavelength which extends to less than 0.9 $\mu$m to 5 $\mu$m.

Figure 2:
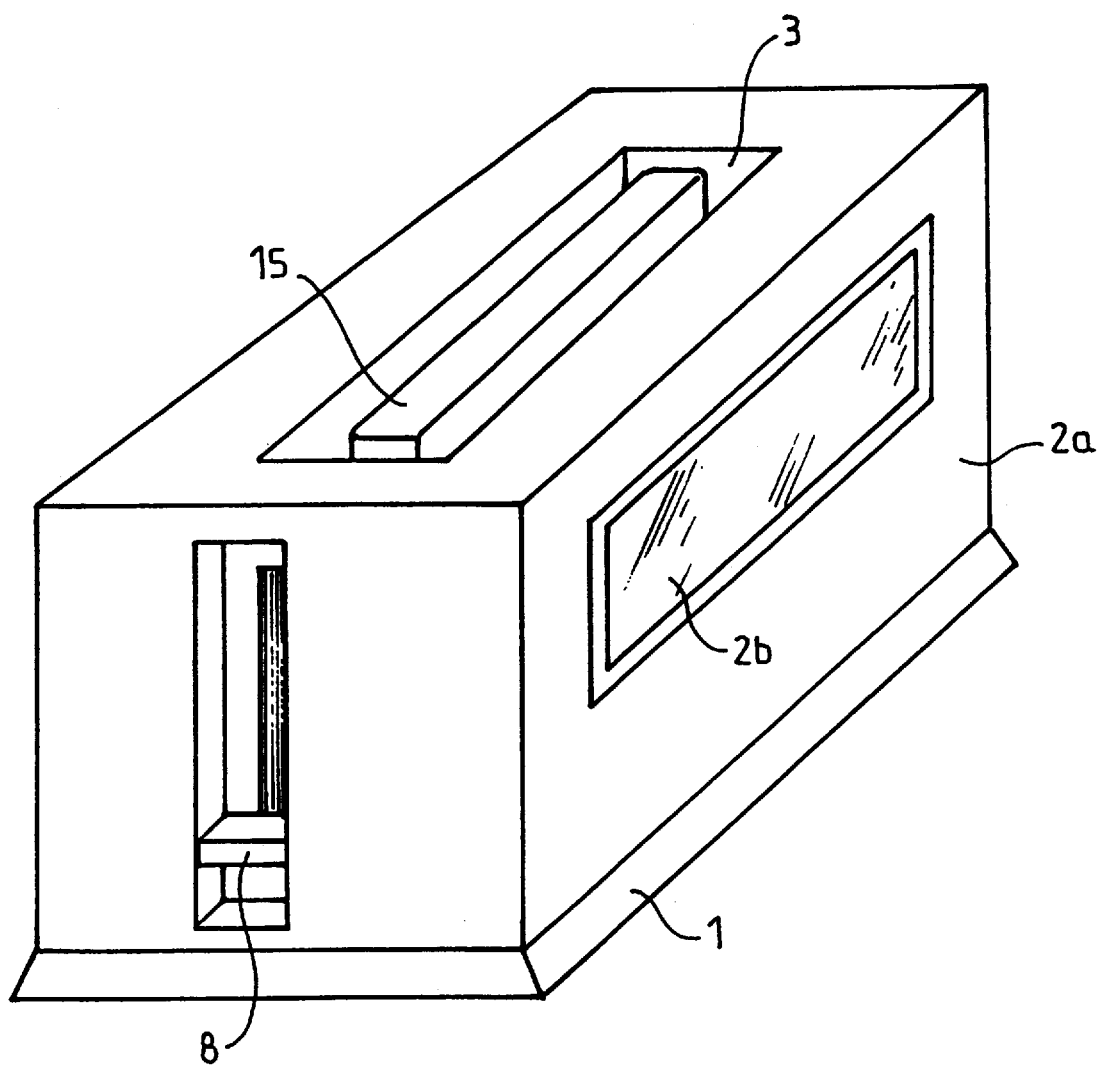
FIG. 2 is a prospective view of an embodiment of an appliance according to the invention.

According to a preferred modified embodiment of the toasting appliance according to the invention, the observation means comprise on at least one side of the appliance a transparent window 2b arranged in a wall 2a of the frame 2 and represented for example in FIG. 2. This transparent frame 2b is situated opposite an open part 7 of the heat reflector 6. The open part 7 is, for example, covered with a transparent plate 7a of the glass type, which can have an enlarging effect. According to an advantageous modification of the appliance according to the invention, the transparent plate 7a is treated with a layer which is reflecting with respect to infrared radiation or which is filtering a part of the emitted spectrum. The transparent plate 7a can equally be heating or be provided for this purpose with a transparent resistive deposit having a base of tin oxide, in order to compensate a possible reduction in performance linked to the opening in heat reflector 6.

In the modified embodiment where the toasting chamber 3a has a fixed grid 5 on one of its sides and a movable grid on another side, the transparent window 2b is situated on the side of the fixed grid 5.

The open part 7 can also be constituted according to another modified embodiment of the appliance by a series of slots or opening arranged in the heat reflector 6. A series of holes or an expanded metal can also be suitable. The series of slots can also be covered by a transparent plate 7a. Advantageously, the transparent frame 2b comprises a part 4 made of glass or transparent plastic. The part 4 can be mounted on a frame 4a secured on the wall 2a. This permits the transparent window 2b to be given an orientation facilitating observations through said transparent window 2b. The utilization of a transparent plate 7a presents the advantage that it does not allow heat energy to escape by convection through the open part 7.

According to an advantageous embodiment of the appliance according to the invention, the heating elements 10 are arranged substantially at mid-height at one side and the other of the toasting chamber 3a. The lighting means 11 is disposed in the vicinity of the low part and the observation means are situated toward the top of the toasting chamber 3a. Such a form of construction permits the toasting chamber 3a to be illuminated from the bottom and as a result illuminate a large part of the product 15.

According to another embodiment of the appliance according to the invention, the lighting means 11 can be arranged in a central position either under the toasting chamber 3a or at the extremities of the toasting chamber 3a in a manner to illuminate the products 15 on at least two of their sides. The heat reflectors 6 are equally utilized to distribute the light in the toasting chamber 3a. According to a complementary modification of an appliance according to the invention, this latter comprises one or several toasting chambers 3a disposed side-by-side and possibly a visual observation means on each wall 2a of the frame 2. Various modifications or rearrangements of these different elements of the toasting appliance according to the invention can be envisioned without departing from the framework of the present invention. Thus, according to a complementary modification of embodiments of the toasting appliance according to the invention, the transparent window 2b can be replaced by a simple opening arranged in the wall 2a.

Another advantage of the toasting appliance according to the invention resides in the limitation of losses by radiation linked to the presence of means for observing the degree of toasting of products 15. Another advantage of the toasting appliance according to the invention resides in the fact that a continuous observation eliminates the need for the user to remove, even partially, the products 15 from the toasting chamber 3a in order to confirm the color or the degree of toasting of said products.

A supplemental advantage of the toasting appliance according to the invention resides in its extremely simple operation. It is thus sufficient to connect the heating elements 10, which are preferably electrically supplied, to then dispose the products 15 on the support 8, to displace said support 8 toward the bottom of the toasting chamber 3a, to observe the progress of the toasting or of the cooking and to evacuate at the end of the cooking operations the products 15 with the same carriage 8. Each toasting operation can thus be adapted to obtain an optimum result which does not depend on either the nature or on the initial state of the products 15, or on the thermal inertia of the toasting appliance or of the heating elements 10. These cooking or toasting operations thus take into account the totality of the parameters which are not considered, in general, with appliances whose cooking operations are programmed in a rigid manner in time, temperature, or in power. The user thus has available the product 15 and in particular toasted bread slices according to his own tastes without having to intervene on programming means of the appliance. Each cooking operation is thus personalized.

The invention finds its application in the technical field of toasting appliances of the toaster type.

The claimed invention is:

1. Toasting appliance for toasting bread products (15), said toasting appliance comprising: a frame (2) which encloses a toasting chamber and which is provided with an insertion slot (3) opening to the toasting chamber (3a), the toasting chamber being arranged to receive the bread products; heating elements (10) and heat reflectors (6) enclosing the toasting chamber, the heat reflectors being disposed to direct heat energy produced by the heating elements (10) toward the bread products, said appliance further comprising observation means for visual monitoring of the degree of toasting of the bread products (15) in the toasting chamber (3a), wherein the observation means comprise a lighting means (11) for lighting the toasting chamber (3a), in a manner to reconstitute a faithful image of the color of the bread products (15).

2. Toasting appliance according to claim 1, wherein one of the heat reflectors (6) has an open part (7) and said observation means comprises a transparent window (2b) disposed in the frame at a location facing the open part (7) of the one of the heat reflectors (6).

3. Toasting appliance according to claim 1, further comprising a support (8) for the bread products, the support being movable within the toasting chamber (3a) in order to dispose the bread products (15) in a toasting position and to evacuate toasted bread products (15) from the toasting chamber (3a).

4. Toasting appliance according to claim 1, wherein the lighting means (11) furnishes a radiation whose spectrum of wavelengths extends from 0.5 $\mu$m to 1.5 $\mu$m.

5. Toasting appliance according to claim 4 wherein the spectrum of wavelengths of the radiation extends from 0.9 $\mu$m to 1.1 $\mu$m.

6. Toasting appliance according to claim 1, wherein the lighting means (11) comprises at least one halogen lamp.

7. Toasting appliance according to claim 1, wherein the lighting means (11) is localized at the interior of the appliance in a manner to at least partially illuminate the at least one side of the bread products (15).

8. Toasting appliance according to claim 1, wherein the lighting means (11) forms a unit with at least one of the heating elements (10).

9. Toasting appliance according to claim 2, wherein the heating elements (10) furnish a radiation in which the wavelength of the maximum energy emitted is less than 1.5 $\mu$m.

10. Toasting appliance according to claim 9, wherein the wavelength of the maximum radiation energy emitted is less than 1.2 $\mu$m.

11. Toasting appliance according to claim 2, wherein the open part (7) is constituted by a series of slots arranged in the one of the heat reflectors (6).

12. Toasting appliance according to claim 2, further comprising a transparent glass plate (7a) covering the open part (7).

13. Toasting appliance according to claim 12, wherein the transparent glass plate (7a) has a layer which is reflecting with respect to infrared radiation.

14. Toasting appliance according to claim 2, wherein the transparent window (2b) comprises a part (4) made of glass or transparent plastic.

15. Toasting appliance according to claim 1, wherein the insertion slot (3) is localized in an upper part of the frame (2) to permit vertical insertion of bread products into the toasting chamber (3a).

16. Toasting appliance according to claim 1, wherein said toasting appliance constitutes a toaster.

* * * * *